(12) United States Patent
Berntsen et al.

(10) Patent No.: US 12,228,483 B2
(45) Date of Patent: Feb. 18, 2025

(54) SYSTEM AND METHOD FOR THE AUTOMATED PREPARATION OF BIOLOGICAL SAMPLES

(71) Applicant: BD KIESTRA B.V., Drachten (NL)

(72) Inventors: Martijn Xander Berntsen, Leeuwarden (NL); Martijn Kleefstra, Surhuisterveen (NL); Roger Petri, Assen (NL); Tino Walter Van Der Zee, Wiuwert (NL)

(73) Assignee: BD KIESTRA B.V., Drachten (NL)

( * ) Notice: Subject to any disclaimer, the term of this patent is extended or adjusted under 35 U.S.C. 154(b) by 305 days.

(21) Appl. No.: 17/235,171

(22) Filed: Apr. 20, 2021

(65) Prior Publication Data
US 2021/0239582 A1  Aug. 5, 2021

Related U.S. Application Data

(62) Division of application No. 14/674,827, filed on Mar. 31, 2015, now Pat. No. 11,016,007.
(Continued)

(51) Int. Cl.
*G01N 1/31* (2006.01)
*G01N 35/00* (2006.01)
(Continued)

(52) U.S. Cl.
CPC ....... *G01N 1/312* (2013.01); *G01N 35/00029* (2013.01); *G01N 35/021* (2013.01);
(Continued)

(58) Field of Classification Search
CPC ............. G01N 1/312; G01N 35/00029; G01N 35/021; G01N 35/04; G01N 2035/00039;
(Continued)

(56) References Cited

U.S. PATENT DOCUMENTS 5,690,892 A * 11/1997 Babler ............. G01N 35/00029
422/65
9,029,129 B2 * 5/2015 Gupta ....................... B01L 3/52
435/286.3
(Continued)

FOREIGN PATENT DOCUMENTS

| JP | 2005314762 A | * | 11/2005 | |
|---|---|---|---|---|
| WO | WO-0142796 A1 | * | 6/2001 | ............. G01N 1/312 |
| WO | 2012130805 A1 | | 10/2012 | |

*Primary Examiner* — Liban M Hassan
(74) *Attorney, Agent, or Firm* — Botos Churchill IP Law LLP (57) ABSTRACT

The present invention describes an automated platform for inoculating a variety of receptacles with biological samples for testing and analysis. The lab automation system includes a plurality of modules used to automate the inoculation of media for subsequent analysis. In this regard, the lab automation system has one module to enter specimen/order information and store an inventory of petri dishes. Another module is used to label the sample receptacles with a unique identifier that associates the receptacles with the sample. Yet another module includes a robot for retrieving sample and inoculating the receptacles. The sample inoculation module also includes an apparatus that will receive slides, inoculate those slides, and further process the slides for analysis. Finally, the lab automation system includes a module that streaks the culture media with the sample. Thus, the automated lab system described herein provides consistent samples with minimal input from a lab operator.

9 Claims, 9 Drawing Sheets

Related U.S. Application Data (60) Provisional application No. 61/973,551, filed on Apr. 1, 2014.

(51) Int. Cl.
  *G01N 35/02* (2006.01)
  *G01N 35/04* (2006.01)

(52) U.S. Cl.
  CPC ... *G01N 35/04* (2013.01); *G01N 2035/00039* (2013.01); *G01N 2035/00326* (2013.01); *G01N 2035/00356* (2013.01); *G01N 2035/00891* (2013.01); *G01N 2035/0405* (2013.01); *G01N 2035/041* (2013.01); *G01N 2035/0424* (2013.01); *G01N 2035/0427* (2013.01)

(58) Field of Classification Search
  CPC .......... G01N 2035/00326; G01N 2035/00356; G01N 2035/00891; G01N 2035/0405; G01N 2035/041; G01N 2035/0424; G01N 2035/0427
  See application file for complete search history.

(56) References Cited

U.S. PATENT DOCUMENTS

| | | |
|---|---|---|
| 2005/0176138 A1 | 8/2005 | Nishimoto et al. |
| 2005/0186114 A1* | 8/2005 | Reinhardt ........ G01N 35/00029 422/65 |
| 2006/0204997 A1* | 9/2006 | Macioszek .......... G01N 35/026 435/6.15 |
| 2008/0190735 A1 | 8/2008 | Luoma |
| 2009/0161312 A1* | 6/2009 | Spearing ............ H05K 7/20781 361/679.53 |
| 2010/0173416 A1 | 7/2010 | Gupta et al. |
| 2010/0291619 A1 | 11/2010 | Robinson |
| 2010/0330654 A1 | 12/2010 | Van et al. |
| 2012/0034687 A1* | 2/2012 | De Gier .................... B01L 9/52 422/63 |
| 2012/0100557 A1 | 4/2012 | Fox et al. |
| 2014/0362436 A1* | 12/2014 | Forget ................... G02B 21/26 359/391 |

* cited by examiner

SYSTEM AND METHOD FOR THE AUTOMATED PREPARATION OF BIOLOGICAL SAMPLES

CROSS-REFERENCE TO RELATED APPLICATIONS

This application is a divisional of U.S. application Ser. No. 14/674,827, filed on Mar. 31, 2015, allowed, which claims the benefit of the filing date of U.S. Provisional Patent Application No. 61/973,551 filed Apr. 1, 2014, the disclosure of which is hereby incorporated herein by reference.

BACKGROUND OF THE INVENTION

Field of the Invention

The present invention relates to a method and system for the automated preparation of biological samples in an automated lab.

Description of the Related Art

With advancements in computers, networking, and robotic technology, automation has become a useful tool in streamlining a wide array of workflow processes. In particular, the use of automation in a laboratory setting has been employed to streamline the process of preparing specimens for laboratory analysis. In laboratory environments for analyzing biological samples (e.g. patient samples, environmental samples, etc.) automating previously manual processes significantly reduces personnel costs, significantly increases volume and significantly reduces the time it takes to analyze the sample and report the results.

However, even using automated equipment, most lab automation systems still require personnel to manually prepare the samples for automated testing and transfer the samples from testing platform to testing platform (i.e. from a sample preparation module to an assay module) because of the wide variety of ways in which biological samples are prepared for assay and testing. Lab environments that require different or multiple personnel for a single assay fail to realize maximum efficiency due to delays in manual handling and processing of the samples. These delays can cause unnecessary delays in diagnosing and treating patients. Moreover, operator errors (e.g., human errors) may result when the operators are tired, distracted, or otherwise unfocused and can lead to processing errors, which may result in an incorrect diagnosis, a late diagnosis and lost or ruined samples. Such errors can potentially adversely affect patients and waste resources.

Thus, there is a need in the art for a lab automation system that is capable of preparing a wide array of biological samples in a variety of formats such as streaked cultures disposed in petri dishes, broth tubes, and slides in a safe, secure, and consistent manner at all times of the day with minimal intervention from a small number of lab operators.

One example of a commercially available system for preparing automated samples is the BD Kiestra™ InoqulA™ automated sample preparation platform. The BD Kiestra™ InoqulA™ is a system that automates certain processes related to preparing biological samples for analysis. However, certain types of sample preparation are very complicated to automate and such sample preparation continues to be done manually. Therefore improvement in automated platforms for biological sample preparation continues to be sought.

SUMMARY OF THE INVENTION

The present invention addresses the above problems with regard to the provision of an automated platform that can prepare biological samples for testing in an array of formats from a single sample. Specifically, the same sample is used to inoculate one or more than one receptacle for downstream processing (e.g. incubation), (i.e. imaging) and analysis. Receptacle, as used herein, is a container or other structure capable of receiving a sample either by manual inoculation, automatic inoculation or both. The receptacle or container capable of receiving the sample will typically contain a substrate or media with constituents such as nutrients that facilitate the assay of the sample for the presence or absence of target microorganisms in the sample. However, a receptacle or container with no media or substrate are also contemplated. Plates are referred to interchangeably throughout as plates or petri dishes. Other exemplary containers or receptacles include, but are not limited to, tubes, slides, etc. Described herein is an automated platform that is capable of inoculating plates, e.g., petri dishes containing plated media, broth tubes, and slides with biological samples for testing and analysis. In this regard, the automated platform for biological sample preparation described herein provides automated sample preparation in a consistent and secure manner that can be managed by fewer lab personnel.

The lab automation system described herein includes a plurality of modules used to automate the inoculation of media in petri dishes, the inoculation of broth tubes and inoculation of slides for subsequent analysis. The lab automation receives an "order" for one or more tests or assays to be performed on a biological sample of interest. The order is processed by the system and the system queues up the sample receptacles (e.g. the petri dish, broth tubes, slides, etc.) that are to be inoculated with sample to fulfill the order. In this regard, a unique identifier (e.g. a bar code) is associated with the sample and all receptacles into which the sample is to be inoculated.

In this regard, the lab automation system has one module to enter specimen/order information and store an inventory of petri dishes. The petri dishes hold culture media that contain nutrients that will support microbial growth in the media should the media be inoculated with sample that contains the type or type of microorganisms that will grow in the media. There are a variety of culture media, each having different nutrients and other additives (e.g. vitamins, indicators, sodium chloride and other constituents that provide the media with the desired consistency and other additives well known to those skilled in the art, the present invention is not limited to use with any one type or composition of growth media) that facilitate the growth of microorganisms or are selected for certain types of microorganisms. The inventory of petri dishes typically provides a selection of petri dishes with a portion of those petri dishes carrying one type of culture media, another portion carrying a second type of media, etc. That is, the inventory of petri dishes provides for a selection of culture media, the culture media being selected that best supports the requested sample assay. Some orders will be fulfilled with more than one petri dish, each petri dish having a different type of culture media disposed therein.

Another module is the labelling module that labels the sample receptacles with the unique identifier that associates the receptacles with the sample. The labelling module is combined with a storage module that provides storage for petri dishes after inoculation. In alternative embodiments, the labeling module may also store error plates (e.g., plates that failed to be labeled correctly or inoculated properly).

Yet another module is the sample inoculation module. In this module there is a robot which retrieves sample from the sample container and inoculates the receptacles (e.g., plates, broth tubes, slides, etc.) requested for processing the sample according to the sample order. The robot in the inoculation module is automated to handle one or more types of receptacles and deposit sample therein using a robotic pipettor. For inoculation using viscous or non-liquid samples, it is not possible to use conventional robotic apparatuses capable of sample transfer from one container to another using an implement for sample transfer such as a loop, swab, etc. During inoculation of media on which the sample is subsequently streaked (i.e. culture media), a magnetic bead is also placed in the receptacle for subsequent streaking of the culture media with sample in the streaking module, as discussed in more detail below.

The sample inoculation module includes an apparatus that will receive slides, inoculate those slides in an automated fashion and further process the slides for analysis. In one embodiment, the slide preparation module is configured as a cartridge with a plurality of slots, each slot adapted to receive a slide. The slide cartridge is equipped with a heating element and a heat circulation element adapted to heat the inoculated slide and dry it for subsequent processing.

The inoculation module may include a first portion in which inoculation is completely automated. In that portion, the liquid sample is pipetted into the receptacle (e.g. media dish, broth tube, or slide) as described above. The semiautomatic or manual second portion of the inoculation module is provided for samples not easily transferred using a pipettor (e.g. a solid or non-liquid sample) or via an automated process. In this second portion of the inoculation module, the media is manually inoculated by an operator using a manual pipettor, loop and/or swab or a robotic instrument that can control the use of an implement such as a swab or a loop to inoculate the sample. Whether the receptacle, e.g., plated media, is inoculated automatically, semi-automatically or manually, the downstream streaking module receives inoculated plates to streak the sample onto the plated media. Additionally, in those embodiments where a manually inoculated plate is to be streaked onto the culture media, a magnetic bead for automatic streaking will be placed on the culture media by the lab operator.

Streaking of plated media is accomplished using the magnetic bead placed in the inoculated culture media. The motion of the magnetic bead is in response to magnets that cause the bead to move in a predetermined pattern, thereby streaking the culture media with sample in the predetermined media. Automated streaking of sample onto culture media using magnetic beads is described in commonly owned U.S. patent application Ser. No. 12/740,746 (US Patent Publication No. 2010/0330654), which is hereby incorporated by reference.

Further advantages will be realized by various aspects of the invention and will be apparent from the following detailed description.

BRIEF DESCRIPTION OF THE DRAWINGS

The invention will be better understood from the Detailed Description of the Preferred Embodiments and from the appended drawings, which are meant to illustrate and not to limit the invention, and wherein.

DETAILED DESCRIPTION OF THE PREFERRED EMBODIMENTS

Figure 1:
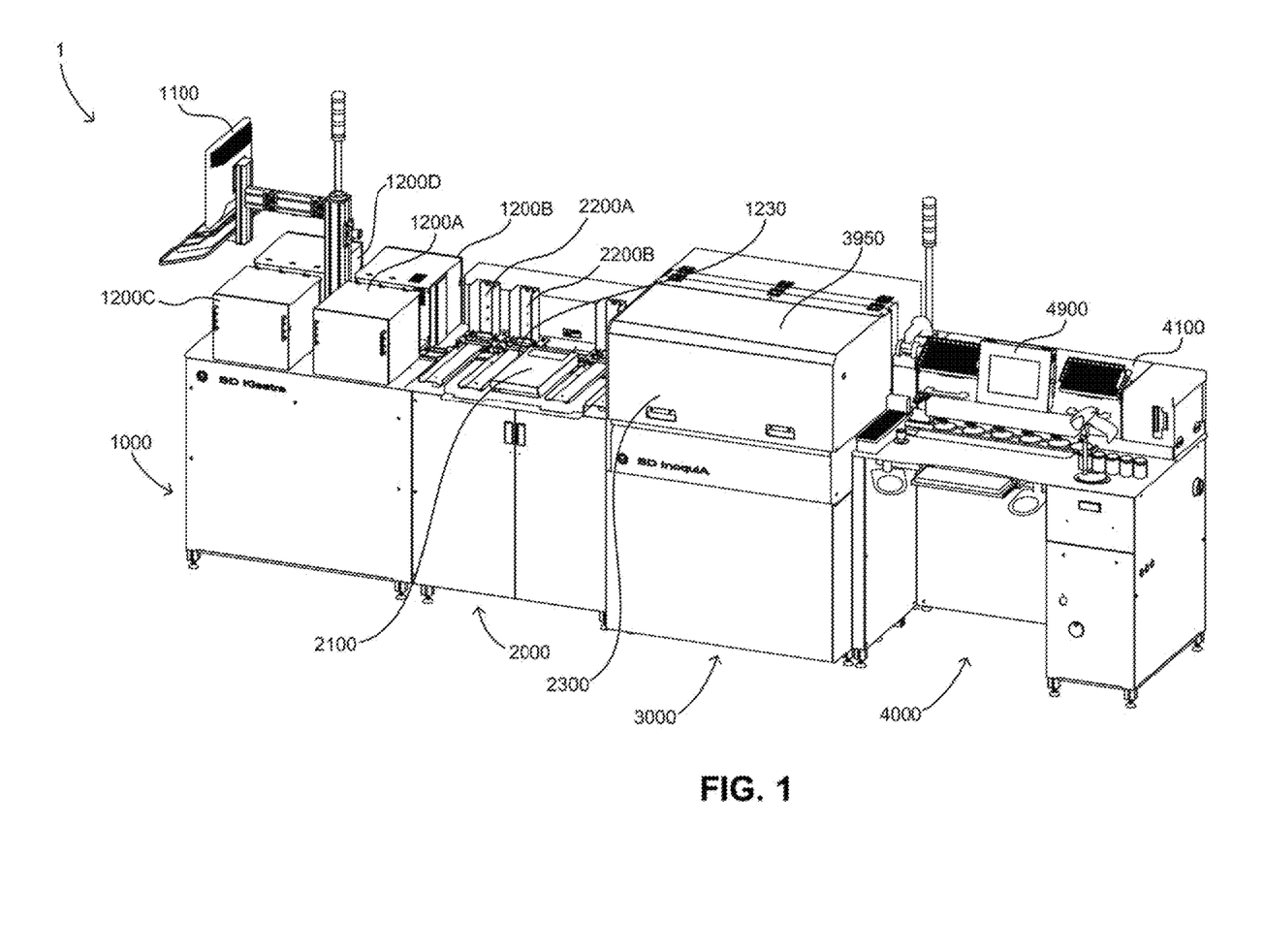
FIG. 1 is a perspective view of an automated inoculation system to be incorporated in an automated lab.

FIG. 1 shows an automated inoculation system 1 according to one embodiment of the invention. The automated inoculation system 1 includes four modules: an ordering and inventory module 1000, a labeling and prepared sample storage module 2000, an inoculation module 3000, and a streaking module 4000. Although the preferred embodiment shows four separate modules, one of ordinary skill in the art will recognize that any of the modules may be used individually and individual modules can be removed without significantly impacting or impeding the functions of the other modules.

The ordering and inventory module 1000 includes a display 1100 and four storage racks 1200A, 1200B, 1200C, and 1200D for storing sample receptacles illustrated as petri dishes. The storage racks provide an inventory of petri dishes carrying different media, such as blood agar, chocolate agar, MacConkey agar, etc. The media can be configured as monoplate (one continuous media that supports the growth of the same target on the entire plate), bi-plate (two sectors, each with a different media that supports growth of a different target), tri-plates (three sectors, each with a different media that supports growth of a different target), or quad plates (four sectors, each with a different media that supports growth of a different target). The ordering module 1000 communicates with a scanner, such as a bar code reader or an RFID reader, to read a specimen label. Such scanners are conventional and are not illustrated. In alternative embodiments, the information can be manually entered by the operator instead of scanning.

Once the label of a specimen received by the system is read by the scanner as discussed below, information regarding the specimen is displayed on display 1100. A lab operator may then manually enter the types of media, streaking, and other pertinent information for preparing and testing the specimen. Alternatively, the label on the specimen may specify the types of media ordered, streaking, and other information related to inoculation of the one or more sample receptacles specified by the order or the operator. Thus, in alternative embodiments, a lab operator need only scan in the specimen to commence inoculation.

After the media types have been entered in the ordering module 1000, the appropriate media is removed from one of the storage racks 1200 (either manually or automatically). Conveyor system 1230 (located, in part, under racks 2200 in FIG. 1) will convey the selected media from storage racks to the storage module for labelling the storage receptacle with a code that corresponds with the sample code. Storage racks 1200A-1200D are capable of holding any desired number of petri dishes, the number of petri dishes so stored being a matter of design choice. The capacity will depend on the size of the petri dish so stored in addition to the size of the racks. The storage racks can be used to both store and organize the library of plated media. In one embodiment, each set of the storage racks may typically contain dishes that carry a certain type of media. For instance, the storage stack 1200A may hold only dishes prepared with a blood agar, while the storage stack 1200B may contain dishes prepared with a chocolate agar.

Alternatively, each of the storage racks 1200A-1200D may contain three rows for storing dishes. Each of the three rows in each of the storage racks 1200 may contain petri dishes carrying different media. For example, the first row of the storage stack 1200A may contain petri dishes carrying a MacConkey agar, the second row of the storage stack 1200A may contain petri dishes carrying a blood agar, and the third row of the storage stack 1200A may contain petri dishes carrying chocolate agar. The ordering module 1000 keeps track of the location where various media types are stored.

In this regard, for plated media an operator begins by preparing plates or dishes with various media. For broth tubes, the lab operator may also prepare broth tubes with various broths (e.g., thioglycollate broth, lauryl tryptose broth, etc.) for inoculation. Typically, the prepared broth tubes will be placed in the inoculation module 3000 to be inoculated with sample as discussed in greater detail below.

Once the media in the plates or dishes has set, the operator loads the dishes into the storage racks 1200A-1200D. For broth tubes, the tubes are delivered into the inoculation module in a rack, or placed in a rack positioned in the module. The operator then records the location of the various media in their respective storage racks via display 1100. Alternatively, the operator, or the manufacturer, may place a label, a bar code or an RFID tag on the dishes or broth tubes indicating which type of media the dish or tube contains. Thus, the ordering module 1000 may read the type of media directly from the dish or tube in alternative embodiments.

When a sample is to be inoculated on a certain media in a petri dish, the storage racks 1200A-1200D deposit one dish carrying the respective media onto the conveyor system 1230. In this regard, each of the racks 1200A-1200D has a one-way gate that releases one petri dish onto the conveyor.

The conveyor system 1230 conveys the petri dish from the ordering module 1000 to the labeling and storage module 2000. The labeling and storage module 2000 includes storage racks 2200A and 2200B and a labeling device 2100.

The storage racks 2200A and 2200B are structurally similar to the storage racks 1200A-1200D. The primary difference between the storage racks 2200A and 2200B and the storage racks 1200A-1200D is the direction of the one-way gate. In this regard, the storage racks 2200A and 2200B are used to collect and organize petri dishes after they have been inoculated with sample and streaked.

According to this embodiment, the conveyor system 1230 of the labeling and storage module 2000 typically has two tracks. The first track typically transports dishes from the ordering module 1000 to the inoculation module 3000 via the labeling device 2100. The second track receives dishes from the streaking module 4000 after the media has been streaked with sample. Alternatively, one skilled in the art will appreciate that the conveyor system 1230 may have a single track that works to both transport dishes from the ordering module 1000 to the inoculation module 3000 and receive dishes that have been streaked from streaking module 4000.

Although only two storage racks 2200A and 2200B are shown in the embodiment of FIG. 1, preferred embodiments of the labeling and storage module 2000 typically have four storage racks. However, one of ordinary skill in the art will recognize that any number of storage racks may be used to collect and organize the petri dishes after being inoculated and streaked. Alternatively, the labeling and storage module 2000 may not have any storage racks and the dishes may be forwarded along a conveyor system to a downstream location, which may be a further instrument or module to facilitate diagnostic testing of the samples. An example of such an instrument is an intelligent incubator and image capturing system, such as the one described in the commonly owned application Ser. No. 14/687,400, entitled "System and Method for Incubation and Reading of Biological Cultures," the disclosure of which is incorporated by reference.

In operation, there is a wireless or wired reader (not shown), similar to the bar code reader or RFID reader discussed above, below each of the storage racks 2200A and 2200B. Other conventional mechanisms for reading labels and sample codes, such as optical character recognition or object character recognition (OCR), are also contemplated. When a petri dish that has been inoculated and streaked is logged by the reader, it is loaded into one of the racks 2200A or 2200B. In this regard, the conveyor system includes a mechanism that lifts the dish into its respective rack. As noted above, the racks 2200A and 2200B include a one-way gate that allows dishes to pass into the racks and prevents them from falling onto the conveyor system below. In preferred embodiments, the storage racks 2200A and 2200B can hold a plurality of petri dishes that have been inoculated and streaked, based on the height of the petri dishes being used. The size of the rack and the number of petri dishes that the rack will hold is largely a matter of design choice.

According to this embodiment, the labeling device 2100 of the labeling and storage module 2000 places a label, a bar code, an RFID tag, or any combination thereof on the dish received from the ordering module 1000. In this regard, the labeling device 2100 includes a lid manipulator, a printer, and a mechanism for affixing the label to the dish. Alternatively, the labeling device 2100 may be a RFID writer that writes information onto a smart chip located on the petri dish.

In one embodiment, the labeling device 2100 receives a petri dish from the ordering module 1000. The lid manipulator advantageously tilts the lid while the printer prints out and applies the label. The label is then affixed to the petri dish using the mechanism. In this regard, tilting the lid, as opposed to removing it completely, reduces the possibility of contaminating the sample and/or the labeling device.

In this embodiment, the label may contain information linking the petri dish to the sample, the media in the dish, and the streaking pattern. Additionally, the label may advantageously include information related to subsequent processing of the prepared sample. For example, the label may include time and conditions for incubation, such as atmospheric conditions, start and end time for incubation, intervals for information for the label will be imaging, etc. Additional readily apparent to those skilled in the art from the embodiments described herein.

After the petri dishes have been labeled by the labeling and storage module 2000, they are moved via a track of the conveyor system 2300 and transported into the inoculation module 3000.

The inoculation module 3000 illustrated in FIG. 1 is typically covered with hood 3950. In preferred embodiments, the hood 3950 includes a window to allow a lab operator to track the movement of the petri dishes through the inoculation module 3000. Furthermore, the hood 3950 opens to allow the lab operator to troubleshoot any issues that might arise in the inoculation module 3000 and to place the sample and other types of receptacles (e.g. broth tubes and slides) for inoculation in the inoculation module. The inoculation module also includes a filter (e.g. a HEPA filter) that can prevent contamination of the laboratory environment the by sample constituents. In this regard, some samples may be aerosolized during sample transfer and the filter prevents those samples from escaping into the environment. In preferred embodiments, the filter is located in hood 3950. However, one of ordinary skill in the art would recognize that filters could be used at several locations to prevent sample from escaping into the lab environment.

In operation, the inoculation module 3000 inoculates receptacles, such as petri dishes, plates, broth tubes, and slides, with sample. While the embodiments described herein refer to receptacles and containers interchangeably, one of ordinary skill in the art would appreciate that they include a wide variety of receptacles. In this regard, receptacles and containers may include any element that is capable of receiving a sample, and allows for the analysis of a biological sample, irrespective of whether the element contains any nutrients or additives (e.g., dishes, plates, broth tubes, etc.) or not (e.g., slides).

While inoculating petri dishes, the inoculation module 3000 also dispenses a magnetic bead in to each of the petri dishes. The magnetic bead may be composed of a unitary material or may be a composite. In this regard, the inoculation module 3000 provides for the inoculation of a plurality of dishes, different receptacles (e.g., plates, broth tubes, slides, etc.) from a single sample container. The inoculation module 3000 will be discussed in greater detail with respect to FIGS. 2A and 2B.

After inoculating the dish with sample and receiving the magnetic bead, the inoculated petri dish is typically conveyed along a conveyor system to the streaking module 4000. The streaking module includes a streaking mechanism 4100 and a display 4900.

The streaking module 4000 illustrated in FIG. 1 may also include equipment to manually inoculate the media with the sample after which the sample is streaked onto the media. In this manual regard, pipettors, loops, swabs, and other apparatuses capable of transferring sample from one receptacle to another are advantageously provided such that a lab operator may manually inoculate solid samples and/or samples with high viscosity that are not readily transferred using a robotic pipettor. Inoculating samples manually is well-known in the art and is not discussed in further detail herein. After the dish has been inoculated, the lab operator places a magnetic bead on the cultured media. As noted above, both manually- and automatically-inoculated samples are then typically provided to streaking mechanism 4100.

The streaking mechanism 4100 includes magnets that cause the magnetic bead deposited in the petri dish to streak the inoculated media with the sample according to a prescribed pattern. The streaking mechanism 4100 will be discussed in greater detail below with respect to FIGS. 5, 6A, 6B, and 7.

The streaking module 4000 also includes the display 4900. The display 4900 is used by the lab operator to troubleshoot and track any problems with the petri dishes as they traverse the automated inoculation station 1. This also includes the ability to reset sample processing for a batch if there is a misread or other error message that causes the system to reject a petri dish. In such instances, when there is more than one receptacle that is being inoculated with a specific sample, only the rejected petri dish needs to be rerun. The rest of the samples can continue to be processed normally unless the entire batch is rejected. According to this embodiment, rejected petri dishes are conveyed to racks 2200 for an operator to remove them. The display 4900 also provides an interface that advantageously allows the lab operator to request that petri dishes that may have been improperly inoculated or otherwise failed to complete the automated inoculation process be removed from the system.

After the petri dishes have been streaked by streaking mechanism 4100, the magnetic bead is removed from the petri dish and discarded. The streaked dishes then travel along another conveyor system to either the storage racks 2200A or 2200B or are conveyed directly into an incubation system as discussed above.

Figures 2A, 2B, 2C:
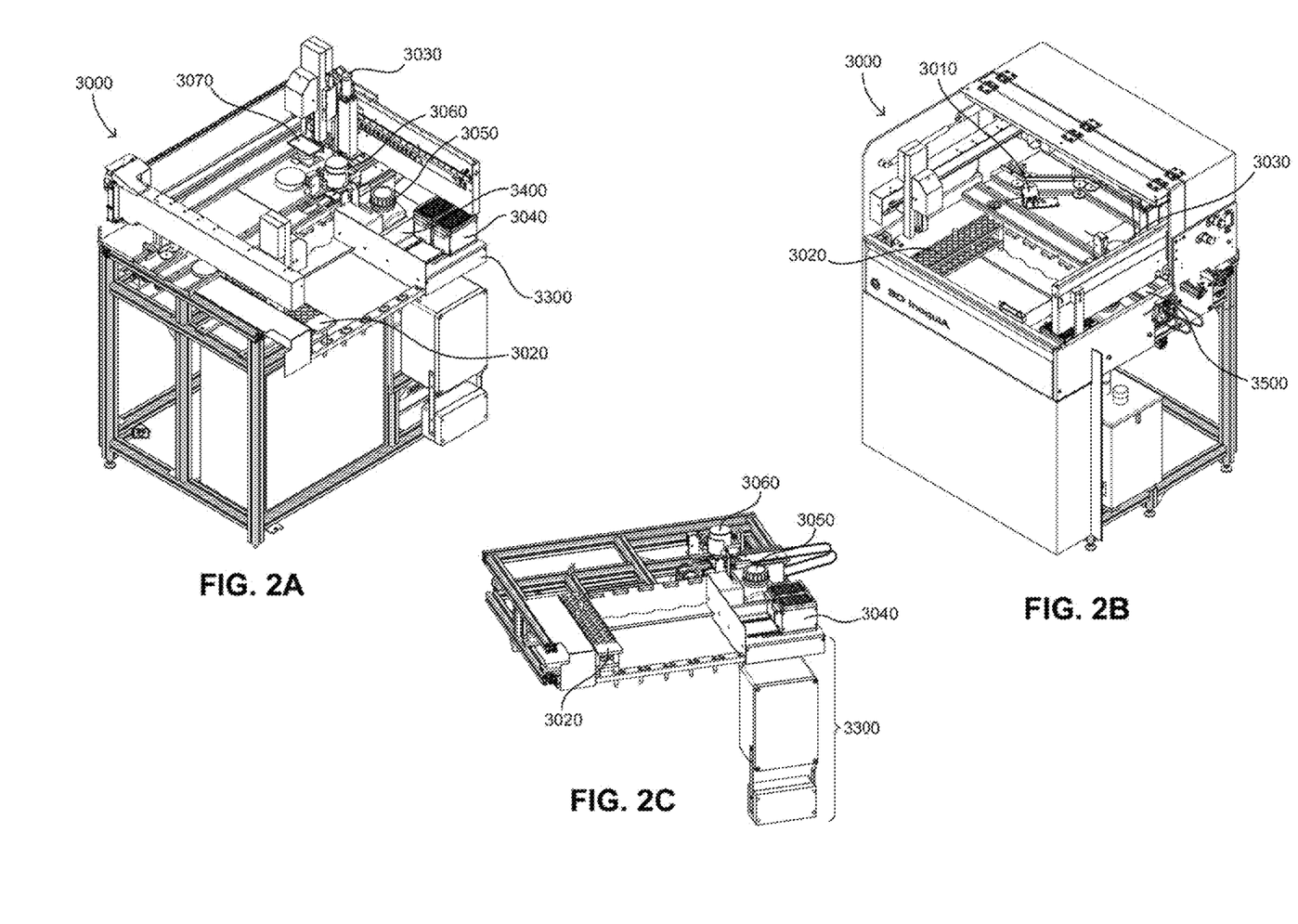
FIGS. 2A-2C are perspective tear down views of the inoculation module in the FIG. 1 system.

Referring to FIGS. 2A and 2B, the interior of the inoculation module 3000 is shown from different perspectives. As noted above, the inoculation module 3000 inoculates the culture media carried by the petri dish with both a specimen and a magnetic bead. In this regard, the inoculation module 3000 typically includes a reader 3010, a lid manipulator 3090, a magnetic bead dispensing unit 3060, a robotic assembly 3030, a pipette unit 3300, and a shaking module 3070.

FIGS. 2A and 2B also show a rack 3020 that has been placed in the inoculation module 3000. Although only one rack is shown in FIGS. 2A and 2B, one of ordinary skill in the art would recognize that multiple racks having a variety of sample sizes may be placed in inoculation module 3000. The rack will contain specimen stored in a closed vessel with a cap that can be opened automatically by the robotic pipettor assembly 3030.

According to preferred embodiments, the rack 3020 may also be used to hold the broth tubes prepared by the lab operator. Typically, broth tubes are preferably stored in separate racks from racks that store specimens. In this regard, a rack containing broth tubes to be inoculated may be located adjacent to a rack containing sample specimen. Inoculation of the broth tubes will be discussed in greater detail below.

The embodiments described herein refer to a robotic pipettor assembly. However, one of ordinary skill in the art would recognize that other devices, such as an articulated robot instruments or tools such as that can manipulate inoculation loops or swabs, could be used to inoculate the media. Moreover, the robotic assembly 3030 may include interchangeable components such that the robotic assembly may function as a pipettor for transferring samples with suitable viscosity for transfer via pipette but, with a change in attachment can also handle a loop for samples that are particulate suspended in a liquid.

Figure 3A:
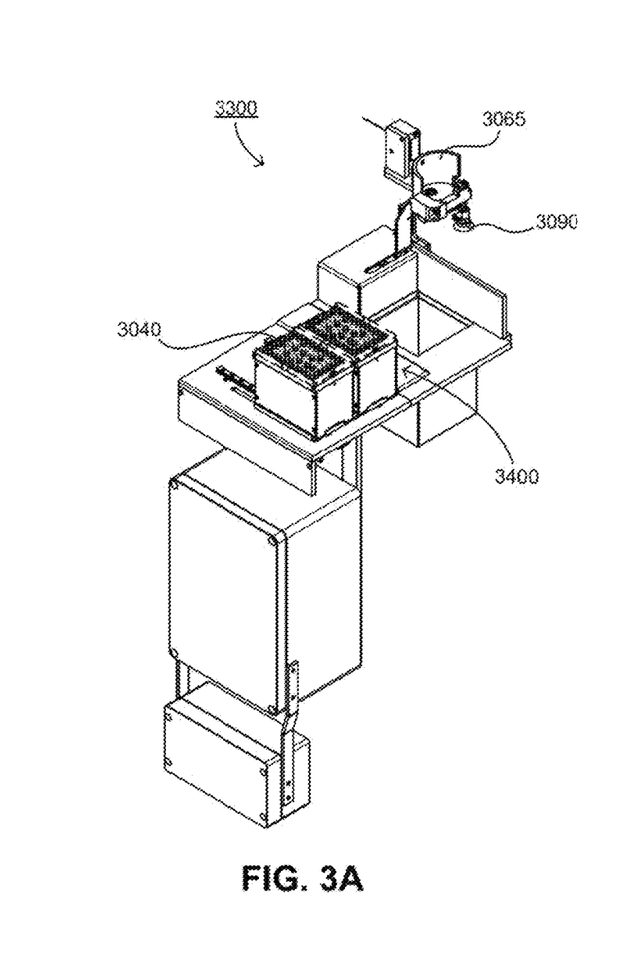
FIGS. 3A-3B show different perspective views of the pipette area of the inoculation module.
Figure 3B:
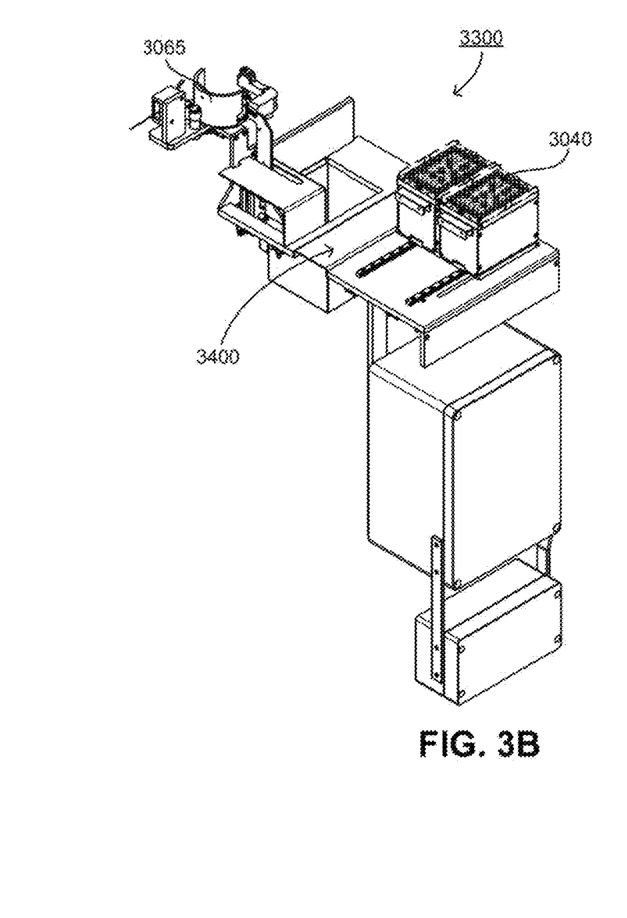

The pipette unit 3300 that stores the inventory of disposable pipette tips includes a pipette carrier 3040, a slide preparation assembly 3400, and a discarded pipette receptacle 3050. FIGS. 3A and 3B show the pipette unit 3300. The slide preparation assembly 3400 will be discussed in greater detail below with respect to FIG. 4.

Turning to FIGS. 3A and 3B, the pipette unit 3300 includes the pipette carrier 3040 and the slide preparation assembly 3400. The pipette carrier 3040 is illustrated as holding pipettes; however, one of ordinary skill in the art would recognize that the pipette carrier 3040 may also include storage space for loops and swabs so that the robotic assembly 3030 may change the dispensing mechanism or so that the loops and swabs can be used for semiautomatic or automatic sample transfer in the sample inoculation module. FIGS. 3A and 3B also show the lid manipulator 3090 and a cup 3065 for the magnetic bead dispensing unit 3060.

Referring to FIGS. 2A, 2B, 2C, 3A, and 3B, when the dish enters the inoculation module 3000, the bar code reader 3010 reads the label that was placed on the petri dish by the labeler 2100. After the label is read, the receptacle holding the sample that corresponds with the sample linked to the petri dish being read is retrieved from the rack 3020 and placed in the shaking module 3070 by the robotic assembly 3030 or other x-y coordinate robot (not shown). The shaking module 3070 then shakes (e.g. vortexing) the sample receptacle to ensure homogeneity of the sample, and proceeds to remove the cap from the sample receptacle.

While the shaking module 3070 is preparing the sample for inoculation, the petri dish is moved along the conveyor system to a location under the lid manipulator 3090. The lid manipulator 3090 removes the lid from the petri dish and advances the dish to a location underneath the magnetic bead dispensing unit 3060. One of ordinary skill in the art would recognize the lid manipulator unit 3090 may have a suctioning device, a claw, or a clamping mechanism, or any other suitable means for grasping and/or lifting off and replacing a lid on a petri dish.

Meanwhile, the robotic assembly 3030 retrieves a clean pipette tip from the pipette carrier 3040 while the shaking module 3070 prepares the specimen. The robotic pipettor assembly 3030, with a clean pipette tip, retrieves a predetermined quantity of sample (e.g. about 1 to about 2 µl) from the specimen storage receptacle located in the shaking module 3070. The robotic pipettor assembly 3030 then proceeds to inoculate the petri dish by dispensing sample at a predetermined location on the media. About the same time, the magnetic bead dispensing unit 3060 dispenses a magnetic bead at another location in the petri dish.

After the sample and magnetic bead have been placed on the media in the petri dish, the lid manipulator 3090 places the lid back on the petri dish. The petri dish is subsequently conveyed to the streaking module 4000 via conveyor 3500. Operation of the streaking module 4000 will be discussed below.

Additional receptacles (e.g., broth tubes, slides, etc.) may advantageously be inoculated while the specimen is decapped in the shaking module 3070. For example, when a broth tube has been ordered for a specimen, the robotic assembly 3030 or another x-y coordinate robot may retrieve an appropriate broth tube from a rack containing broth tubes prepared with a variety of broths. The broth tube is typically transferred to a holding station (not shown) where its cap is removed.

The robotic pipettor assembly 3030 will retrieve another quantity of sample (e.g. about 1 to about 2 µl) from the specimen storage receptacle. The robotic pipettor assembly 3030 inoculates the broth tube by dispensing sample into the broth. According to this embodiment (e.g., embodiments where multiple receptacles are inoculated from the same sample), the same pipette tip used to inoculate the plated media may be used to inoculate the broth tube. Alternatively, the robotic pipettor assembly 3030 may advantageously obtain a clean pipette to reduce the risk of contamination.

Once the broth tube has been inoculated, the cap is placed back on the broth tube. Typically, the robotic assembly 3030 then returns the broth tube to the rack 3020 for later retrieval by the lab operator.

The inoculation module 3000 also includes a slide preparation assembly 3400 for inoculating slides. The slide preparation assembly 3400 cooperates with the robotic assembly and other components of the inoculation module to provide automated inoculation and slide preparation.

Figure 4A:
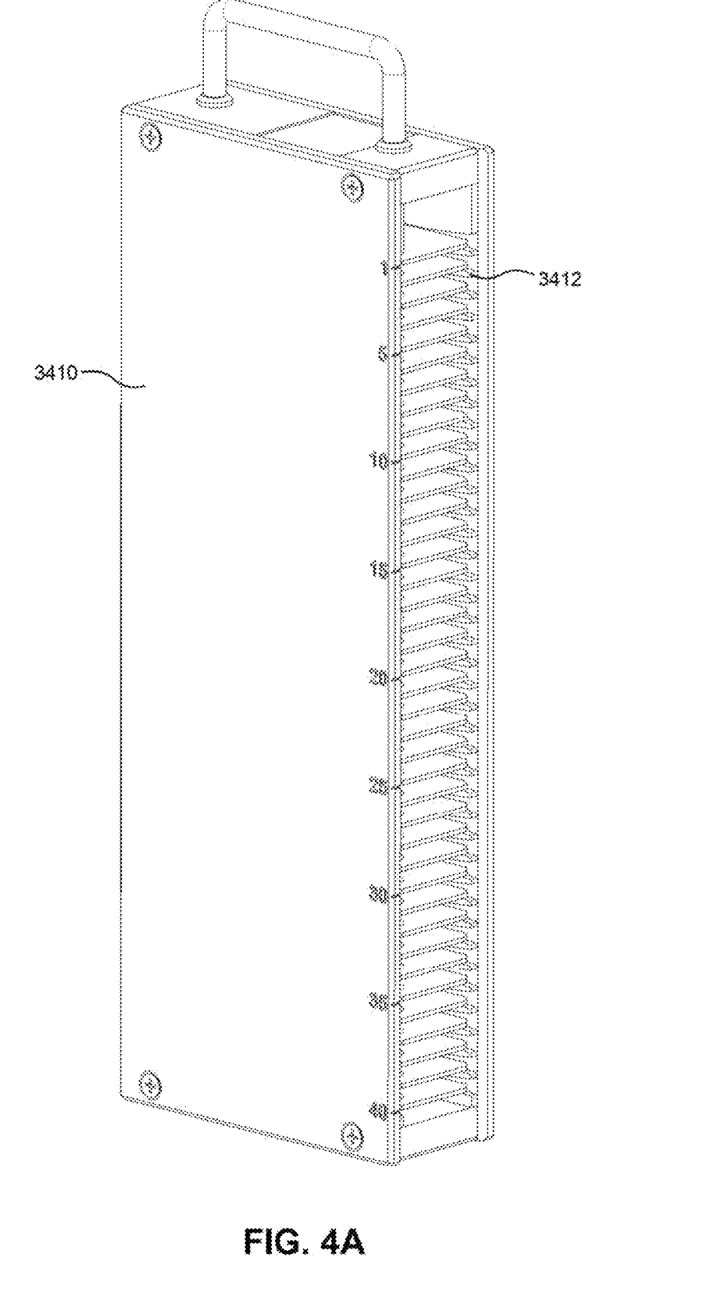
FIGS. 4A-4C the illustrate slide preparation assembly.
Figure 4B:
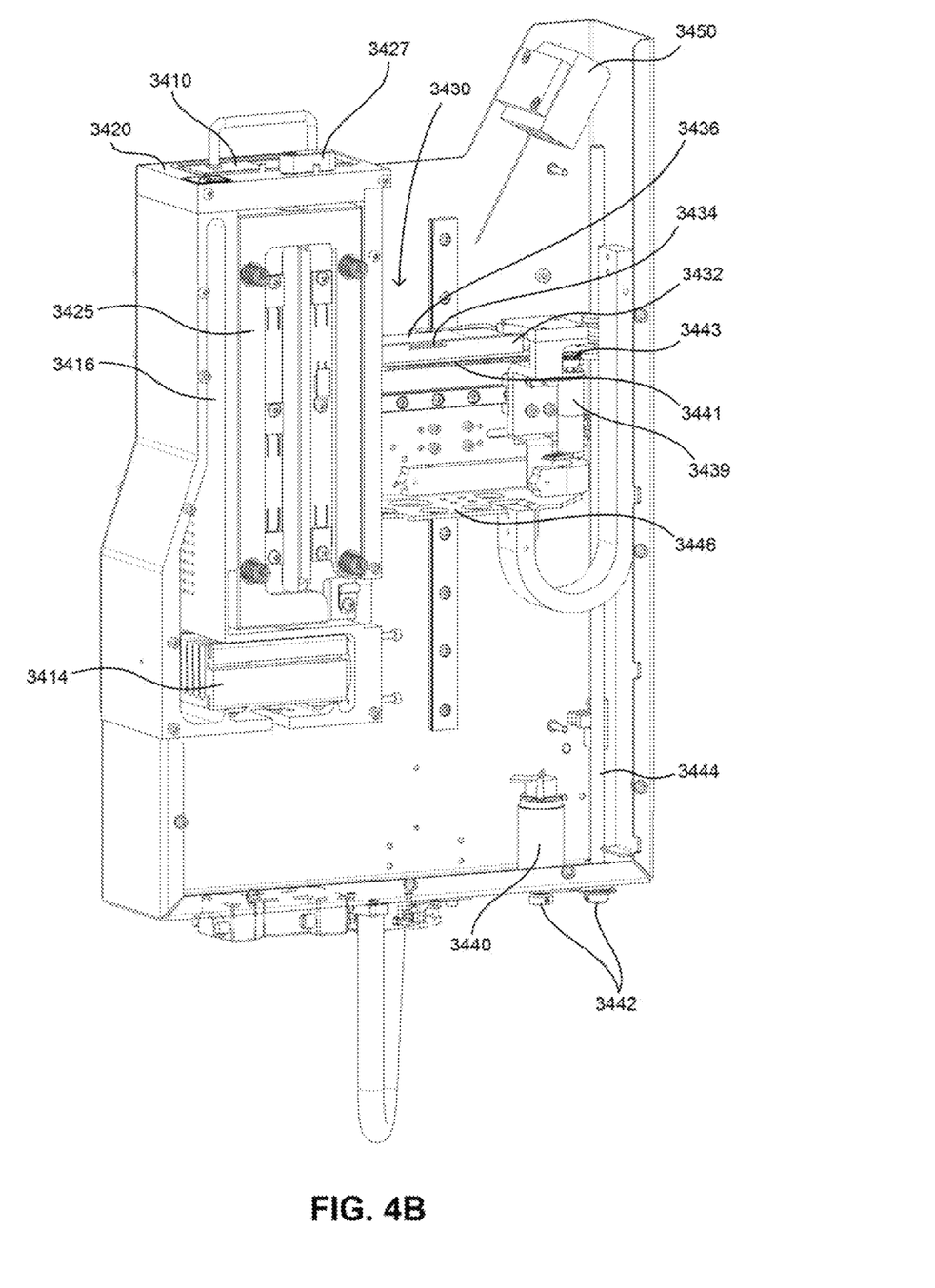
Figure 4C:
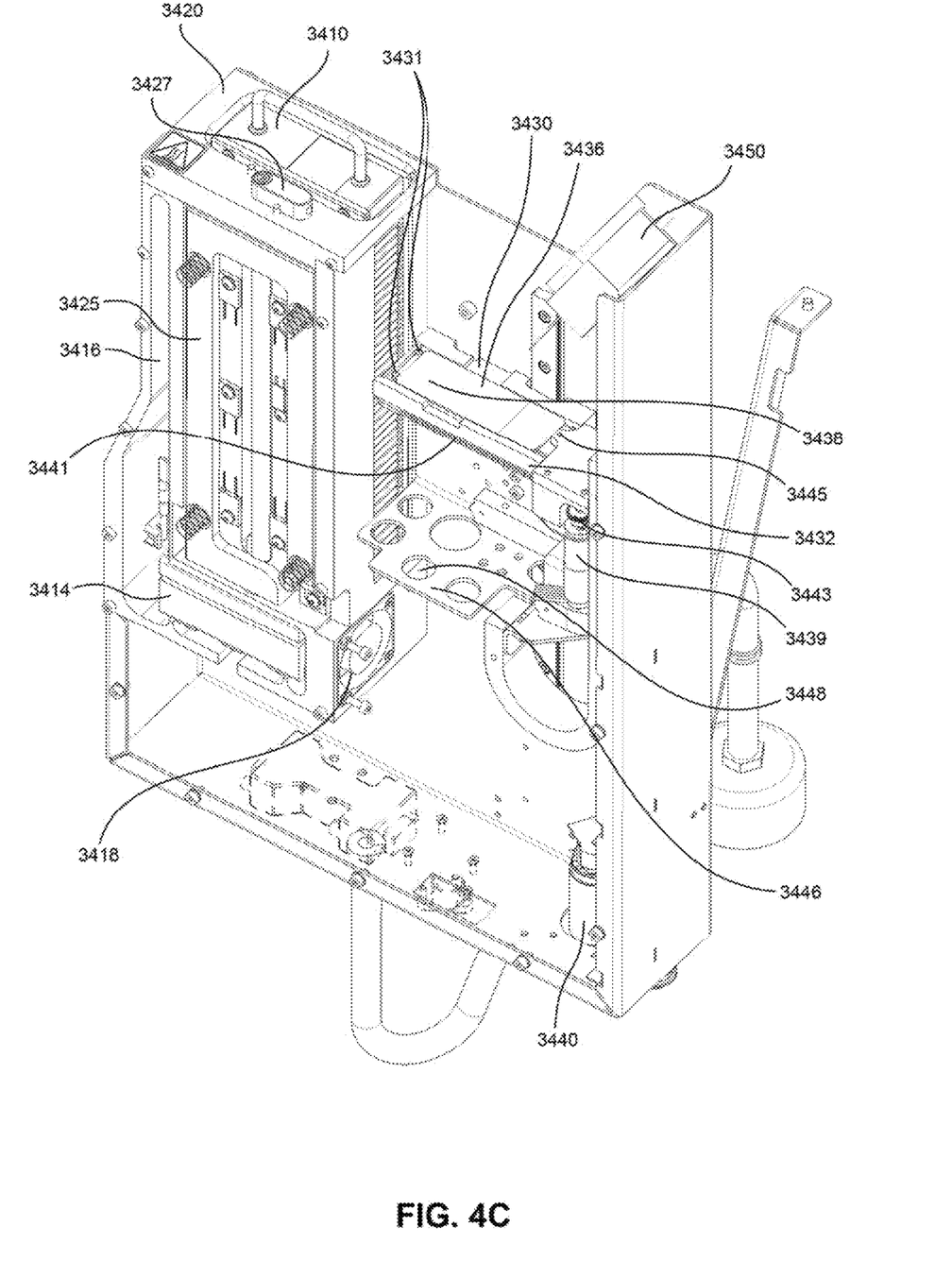

Turning to FIGS. 4A-4C, the slide preparation assembly 3400 is shown. The slide preparation assembly 3400 includes a slide cartridge 3410, a slide cartridge holder 3420, an automated arm mechanism 3430, and a reader 3450.

The slide cartridge 3410 is capable of receiving and holding a plurality of slides as shown in FIG. 4A. In one embodiment, the slide cartridge 3410 includes slots or compartments 3412 for receiving up to 40 slides. The capacity of the slide cartridge is merely for example as the capacity of the cartridge is a matter of design choice. Additionally, the slide cartridge 3410 has enough clearance between each individual cartridge to allow a robotic mechanism 3430 to lift or grasp a slide from the individual slot 3412 and remove or slide it into or from the slide cartridge 3410.

The slide cartridge holder 3420 is received by a recessed compartment in the pipette unit 3300. The slide cartridge holder 3420 advantageously has a mechanism for drying the inoculated sample on the slide. In the illustrated embodiment, this mechanism is a side heat plate 3425, a bottom heat plate 3414, a fan 3418, and a back air channel 3416. The heat plates are capable of heating the slides to a temperature between approximately 30° C. and approximately 90° C. In preferred embodiments, the heat plates heat the slides to between 40° C. and 65° C. in order to dry the sample on the slides in the slide cartridge.

In some embodiments, the slide cartridge holder 3420 also includes a locking mechanism 3427. The locking mechanism 3427 is used to secure the slide cartridge 3410 into place within its recessed slide cartridge holder 3420. The locking mechanism 3427 may include an indicator that transmits a signal that starts and/or stops the heating mechanism. The locking mechanism may also indicate to the system that a cartridge of slides for inoculation has been placed into the recessed compartment and is ready for inoculation.

The slide preparation assembly 3400 also includes an arm mechanism 3430. An example of the arm mechanism 3430 includes a body 3432, slide arm 3434, and a catch plate 3446. In this respect, the arm mechanism 3430 is used to retrieve slides from the slide cartridge 3410 for specimen preparation.

The slide arm 3434 of the arm mechanism 3430 may advantageously include a sensor 3438 (shown in phantom under the slide 3436) to determine whether a slide 3436 is located on the body 3432. The body 3432 may also include one or more motors for moving the arm mechanism 3430 vertically and horizontally to retrieve slides. The body 3432 also has a rail 3441 configured to mate with a gear 3443 attached to a motor 3439. As the motor 3439 rotates the gear 3443, the slide arm 3434 moves into and out of the cartridge 3410.

The slide arm 3434 advantageously includes at least a pair of rivets 3431 at one end to maintain the position of the slide 3436 on the slide arm 3434 as the slide is removed from a compartment 3412 of the slide cartridge 3410. In other embodiments, the body 3432 has a plurality of hinged grips that are used to secure slides to the slide arm 3434. The slide arm 3434 is configured such that it fits between slide supports (not shown) positioned on each side of the compartments 3412 in the slide cartridge 3410 that supports the slide in the compartment yet allows the slide arm 3434 to insert into the compartment 3412 beneath the slide 3436 and, when raised and retracted, removes the slide 3436 from the compartment 3412. This is but one example of many different mechanisms that might be deployed to allow the slide to be removed from and replaced into a compartment.

In alternative embodiments, the rivets 3431 may engage complementary structures in the slide. In still further alternative embodiments, the slide arm 3434 may have a hole (not located therein to allow the sensor 3438 located in the shown) body 3432 to determine the presence of the slide. Other mechanisms by which the slide arm 3434 might engage the slide to advance the slide into and remove the slide from a compartment are well known to one skilled in the art.

The catch plate 3446 is positioned under the slide arm 3434 and includes one or more holes 3448 to allow air to flow through the module. The catch plate 3446 can prevent objects from falling to the bottom of the module during operation or cleaning of the module.

The slide preparation assembly 3400 also includes a reader 3450, such as a bar code reader or an RFID reader. The reader 3450 is used to verify a label on the slide that corresponds to the sample that will be inoculated onto the slide.

In preferred embodiments, the slide preparation assembly 3400 receives a signal that a slide specimen is to be prepared. In some embodiments, this signal can be provided by locking mechanism 3427 being moved into a locked position when a cartridge 3410 carrying slides for preparation is placed into the recessed slide cartridge holder 3420 for inoculation. In alternative embodiments, the recessed compartment may have a sensor (not shown) that detects when a slide cartridge 3410 is located therein. When the signal detects that the slide cartridge 3410 is present, a signal is sent that indicates slides are to be prepared. Additionally, reading label information on the specimen may provide a signal to the inoculation module 3000 that a slide has been ordered for a specific specimen.

After receiving an indication that a slide specimen is to be prepared, the arm mechanism 3430 maneuvers into position and removes a slide from the slide cartridge 3410 using the slide arm 3434. The arm mechanism 3430 is coupled to a shaft 3444 that aligns the slide arm with a selected compartment 3412. The shaft 3444 can be a threaded rod, spline, etc. that moves the arm mechanism relative to the cartridge 3410 as the shaft is moved. The shaft 3444 is coupled to a motor 3440 by pulleys 3442 and a drive belt, chain, etc. Once aligned, the motor 3439 rotates the gear 3443 to move the slide arm 3434 into a compartment 3412 below the selected slide until the rivets 3431 are behind the end of the slide 3436. The arm mechanism 3430 is then raised until the slide 3436 is resting on the slide arm 3434. As the motor 3439 rotates to retract the slide arm 3434 and slide 3436 from the compartment 3412 in the slide cartridge 3410, the rivets 3431 engage the slide 3436 to maintain the slide on the slide arm 3434. Once the slide arm 3434 is clear of the cartridge 3410, the arm mechanism 3430 is raised by the shaft 3444 until the slide is in the vicinity of the reader 3450 or the pipettor assembly 3030.

In alternative embodiments, the slide is securely gripped by the arm mechanism 3430. Configuring the arm mechanism to grip the slide is a function of the specific mechanism and is not described in detail herein. Persons skilled in the automated handling of articles are able to configure a suitable gripping mechanism.

With the slide coupled to the arm mechanism 3430, the reader 3450 will typically read a label that is placed on the slide. One of ordinary skill in the art will recognize that the reader may be any type of reader capable of reading encoded information, such as a bar code scanner or an RFID reader.

Once the label has been read, the specimen is retrieved from the specimen rack 3020 and moved to the shaking module 3070 as discussed above. The shaking module 3070 ensures that the sample extracted therefrom is homogeneous. The robotic pipettor 3030 removes the cap from the sample receptacle.

Alternatively, the slide may be obtained while the specimen is already located in the shaking module 3070 as discussed above. Advantageously, this prevents the robotic assembly from repeatedly retrieving the same sample. Furthermore, this arrangement allows for different types of receptacles to be inoculated from a single specimen, as described above, in a relatively short period of time.

The robotic assembly 3030 retrieves a clean pipette from the pipette carrier 3040. The robotic pipettor assembly 3030 retrieves a predetermined quantity of sample (e.g. about 1 to about 2 µl) of the homogeneous sample for slide inoculation. The robotic pipettor assembly 3030 positions the pipette tip over the slide at a predetermined distance using conventional automated positioning sensors (such as capacitance sensors that can detect the distance based on capacitance) and dispenses a predetermined amount of the sample on the slide to wet the area of the slide intended to receive the sample. The robotic pipettor assembly 3030 moves over the slide 3436 to dispense the sample while the slide is on the arm mechanism 3430. Preferably, the slide is provided with a hydrophobic barrier around the area that receives the sample so that surface tension keeps the dispensed sample in the desired location on the slide. The robotic pipettor assembly 3030 is optionally configured to aspirate a portion of the sample dispensed on the slide leaving only a thin film of sample on the slide.

After aspirating sample from the slide, the robotic pipettor assembly 3030 discards the aspirated portion of the sample along with the pipette tip used to inoculate the slide. In this regard, the pipette tip may have contacted the surface of the slide or come in contact with other contaminants located in the inoculation module 3000. Thus, the aspirated specimen and pipette tip are discarded to prevent contamination of the specimen, other dishes or the inoculation module.

Meanwhile, the slide inoculated with sample is returned to the slide cartridge 3410 by the arm mechanism 3430 in a manner similar to the retrieval operation so the specimen can be dried on the slide. The arm mechanism 3430 further includes a positioner 3445 which may extend into the compartment 3412 when returning the slide 3436. It is believed that this will assist in securely placing the e 3436 back in the compartment 3412 in the slide cartridge 3410.

The process for drying the slides begins with activating the bottom heat plate. The fan is also activated so that it pushes the hot air generated from the bottom heat plate through the back air channel. As noted above, the back air channel runs vertically up one side of the cartridge holder 3420 and has holes such that the hot air can pass over the slides in the slide cartridge 3410. In alternative embodiments, the slide cartridge holder 3420 also has a side heat plate 3425 to help in drying the slides. One of ordinary skill in the art would recognize that the side heat plate 3425 may be used instead of the bottom heat plate.

After all the slides are dried, the slide cartridge 3410 can be removed from the inoculation module 3000. In this regard, a lab operator will remove the slides from the slide cartridge 3410 for further sample preparation (e.g. staining) and sample inspection. For example, the samples are prepared so that they can be viewed under a microscope or inspected by other such magnifying devices.

Figure 5:
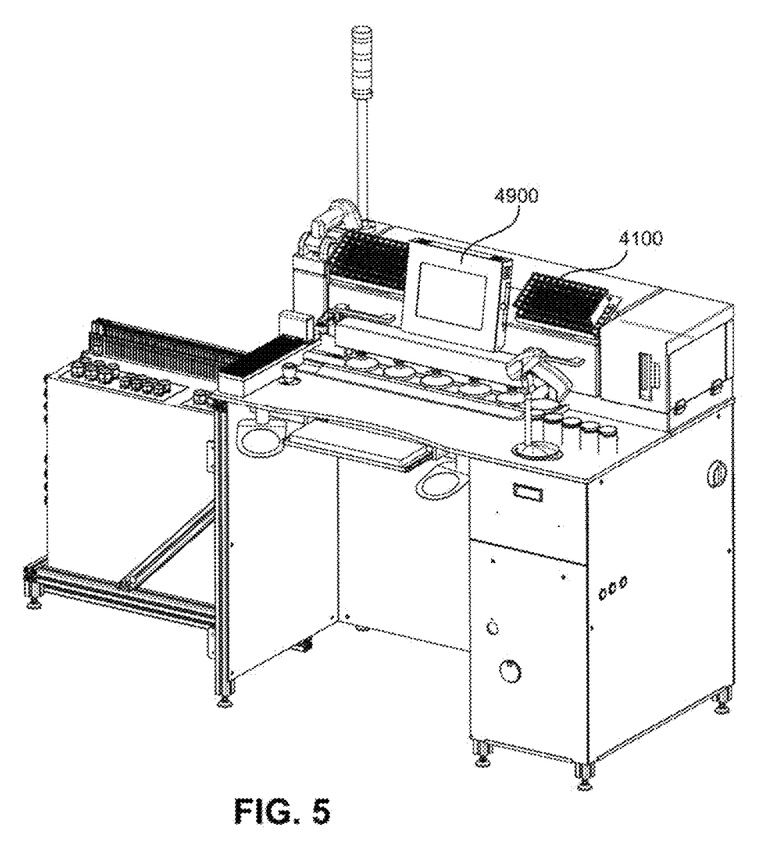
FIG. 5 is a perspective view of the sample streaking module.

Turning to FIG. 5, the sample streaking module 4000 is shown. As discussed above, the sample streaking module 4000 includes a display 4900 and a streaking mechanism 4100. The sample streaking module 4000 also includes a series of conveyors to transport the dishes. The conveyors are well-known and will not be described in greater detail herein.

Additionally, the streaking module 4000 may also include one or more reading devices, such as a bar code scanner or an RFID reader. In alternative embodiments, the streaking module 4000 may also include equipment for a lab operator to prepare slides, plates, and tubes by hand. In this regard, the robotic pipettor assembly 3030 has limitations for specimens with a high viscosity. For example, an insufficient amount of a specimen with a high viscosity may be placed in a dish. Thus, there may be a need to manually prepare petri dishes and slides. The streaking module 4000 meets that need by providing the materials to prepare dishes and slides manually.

As discussed above, the streaking module 4000 includes equipment, such for example, manual pipettors, loops, or swabs, to inoculate high viscosity samples or samples with suspended particulate. Additionally, the streaking module 4000 may also store petri dishes with a variety of cultured media, broth tubes, and slides for a lab operator to manually prepare samples. Once the lab operator inoculates the receptacle with the appropriate sample dispensing device, a magnetic bead is advantageously placed on the cultured media to facilitate automated streaking of the sample on the media. The manually prepared sample is then provided to the streaking mechanism 4100 to automatically streak the sample.

Figures 6A, 6B:
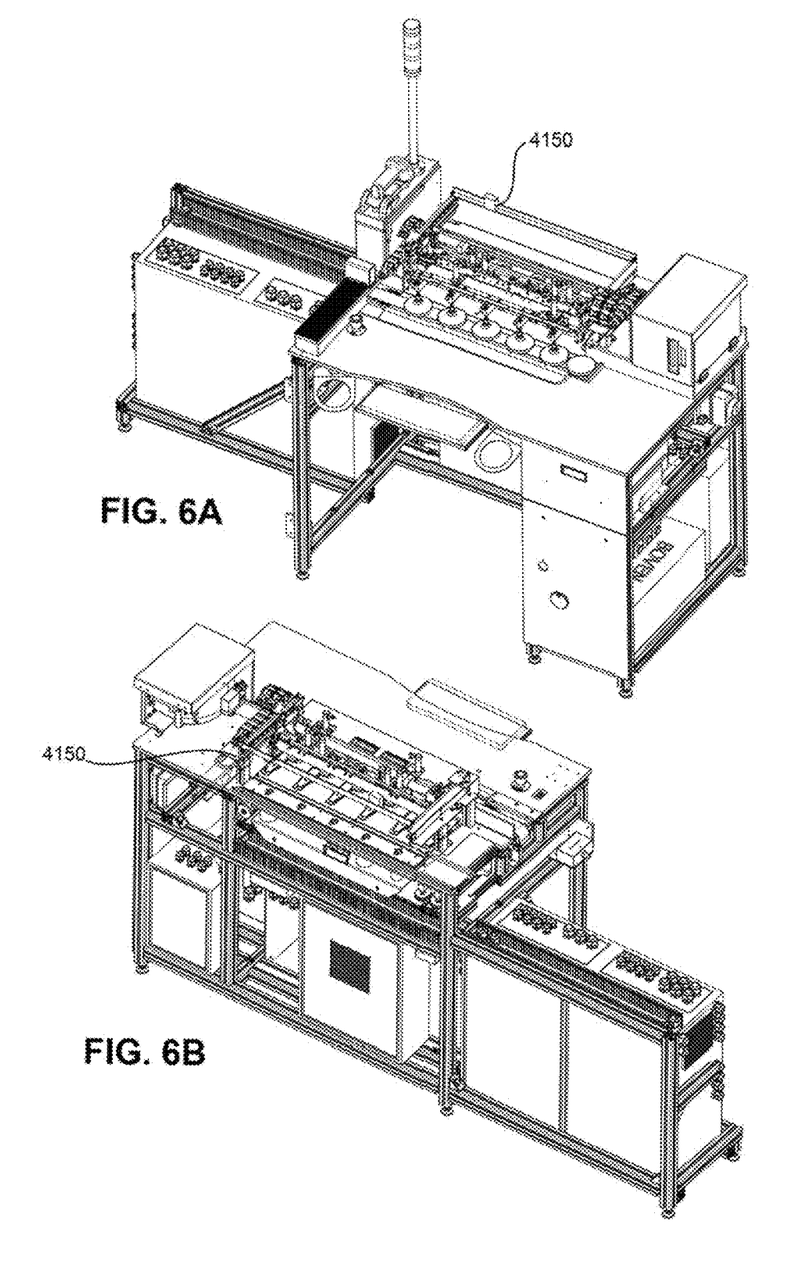
FIGS. 6A-6B show a top front and rear perspective views of the streaking module, respectively.

Referring to FIGS. 6A and 6B, the interior of the streaking module 4000 is shown, revealing the mechanisms used to manipulate the petri dishes, and remove the lids therefrom. The streaking mechanism 4100 typically includes a lid management unit 4150 and a plurality of magnets located below the surface.

Figure 7:
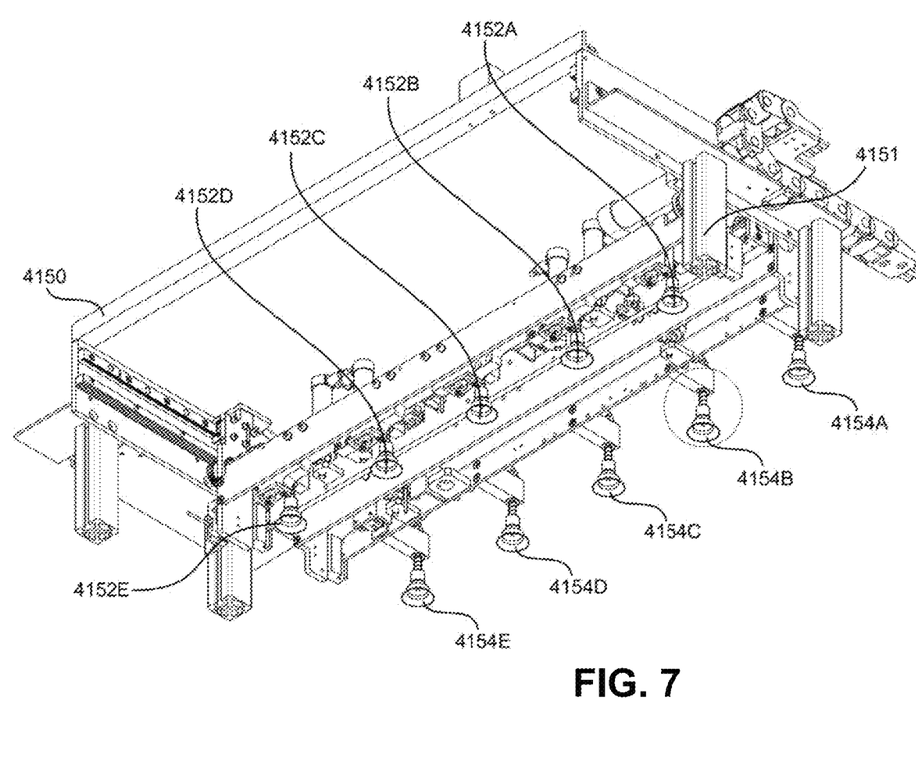
FIG. 7 shows the lid manipulator of the streaking module.

The lid management unit 4150 is shown in greater detail in FIG. 7. In this regard, the lid management unit 4150 typically includes a lid management mechanism 4151 that has at least one lid manipulator unit 4152. FIG. 7 illustrates five lid manipulator units 4152A, 4152B, 4152C, 4152D, and 4152E. The lid manipulator units 4152A, 4152B, 4152C, 4152D, and 4152E advantageously remove the lids from a plurality of dishes to allow the magnets to be recovered once the plates have been streaked. The magnets removed from the petri dishes are then placed in a receptacle from which they can be either discarded or washed and reused. Magnets located under the surface of the streaking module 4000 are used to cause the magnetic bead to streak the culture media in a predetermined streaking pattern. This pattern can be programmed by the operator or can be part of the sample instructions associated with the particular sample.

The streaking pattern may be any known streaking pattern, such as a zigzag pattern, a t-streak, etc. Streaking patterns will be readily apparent to those skilled in the art from the embodiments described herein.

One of ordinary skill in the art would recognize that the lid manipulator units 4152A, 4152B, 4152C, 4152D, and 4152E may have a suctioning device, a clamp, a hook, or any other suitable means for gripping, lifting off and replacing a lid on a specimen dish. Although the illustrated embodiment shows five lid manipulator units, one of ordinary skill in the art will recognize that more or less lid manipulator units could be used as appropriate.

The lid management unit 4150 also includes magnets 4154A, 4154B, 4154C, 4154D, and 4154E that correspond to each of the lid manipulator units. The magnets 4154A, 4154B, 4154C, 4154D, and 4154E are configured to lift the magnetic beads out of the dish after the streaking pattern has been completed.

In operation, magnets 4154A, 4154B, 4154C, 4154D, and 4154E are typically activated after the streaking pattern has been completed. The magnetic beads are advantageously lifted from the dish. The lid manipulator units 4152A, 4152B, 4152C, 4152D, and 4152E replace the lids back on the dishes. The petri dishes advance to a conveyor system (not shown) where they are either conveyed to a sample processing station, such as an incubator, or the petri dishes are conveyed to a stacking system as described above where they are collected by an operator for further processing. Once the dishes clear the streaking module 4000, the magnets 4154A, 4154B, 4154C, 4154D, and 4154E are deactivated and the magnetic beads advantageously fall or are otherwise placed into a biomedical waste receptacle.

The above lab automation system standardizes processes and ensures consistent and high-quality streaking for all specimen types. Moreover, lab automation increases efficiency and provides a more consistent result with a faster turnaround time.

Although the invention herein has been described with reference to particular embodiments, it is to be understood that these embodiments are merely illustrative of the principles and applications of the present invention. It is therefore to be understood that these and various other omissions, additions, and numerous modifications may be made to the illustrative embodiments and that other arrangements may be devised without departing from the spirit and scope of the present invention as defined by the appended claims.

The invention claimed is:

1. An automated sample preparation module comprising:
a receptacle cartridge having a plurality of compartments, each compartment configured as a slot that receives and supports a single slide inoculated with a sample;
a receptacle cartridge holder into which the receptacle cartridge is received, wherein the receptacle cartridge holder is fixed in position in a recessed compartment and includes a heater configured to heat slides carried into the receptacle cartridge holder by the receptacle cartridge;
an automated arm mechanism configured to move slides into and out of an individual compartment of the plurality of compartments in the receptacle cartridge; and
a reader positioned to read an identifier on at least one of the slides, wherein the arm mechanism comprises a body and a slide arm comprising a flat surface for receiving a slide thereon, the slide arm also being configured to move vertically to advance a slide into proximity with the reader wherein the arm mechanism further comprises a sensor positioned to detect a presence of at least one slide on the flat surface of the slide arm.

2. The automated sample preparation module of claim 1, wherein the heater comprises at least one of a heat plate, a fan, and an air channel.

3. The automated sample preparation module of claim 2, further comprising a lock engageable with the receptacle cartridge holder, the lock including an indicator configured for signaling when the receptacle cartridge is locked in the receptacle cartridge holder.

4. The automated sample preparation module of claim 3, wherein the heater operates only when the lock is engaged.

5. The automated sample preparation module of claim 3, wherein the slides are loaded into the compartments of the receptacle cartridge only when the lock is engaged.

6. The automated sample preparation module of claim 1, wherein the slide arm comprises a structure that will engage a complementary structure on the slide such that, when the complementary structures are engaged, the slide will travel with the slide arm.

7. The automated sample preparation module of claim 6, wherein the structure is selected from the group consisting of a hole and a rivet.

8. The automated sample preparation module of claim 1, wherein the reader comprises at least one of an RFID reader and a bar code reader.

9. The automated sample preparation module of claim 1, further comprising at least one motor in the body to move the slide arm mechanism relative to the receptacle cartridge.

\* \* \* \* \*